US010643141B2

(12) United States Patent
Laptev et al.

(10) Patent No.: US 10,643,141 B2
(45) Date of Patent: May 5, 2020

(54) USER ACTION PREDICTION (71) Applicant: Oath Inc., New York, NY (US)

(72) Inventors: Nikolay Pavlovich Laptev, Ventura, CA (US); Xiaokui Shu, Blacksburg, VA (US)

(73) Assignee: Oath Inc., New York, NY (US)

( * ) Notice: Subject to any disclaimer, the term of this patent is extended or adjusted under 35 U.S.C. 154(b) by 989 days.

(21) Appl. No.: 14/849,008

(22) Filed: Sep. 9, 2015

(65) Prior Publication Data
US 2017/0068899 A1    Mar. 9, 2017

(51) Int. Cl.
*G06N 7/00* (2006.01)
*G06F 16/954* (2019.01)
*G06F 16/955* (2019.01)

(52) U.S. Cl.
CPC .......... *G06N 7/005* (2013.01); *G06F 16/954* (2019.01); *G06F 16/955* (2019.01)

(58) Field of Classification Search
CPC ......... G06F 17/30873; G06F 17/30876; G06F 21/10; G06F 2221/2133; G06N 7/005; G06Q 30/02; G06Q 30/0201; G06Q 30/0251
USPC ............................................. 706/46
See application file for complete search history.

(56) References Cited

U.S. PATENT DOCUMENTS

| 9,516,053 | B1* | 12/2016 | Muddu | H04L 63/1425 |
| 9,769,030 | B1* | 9/2017 | Ramalingam | H04L 67/22 |
| 9,985,943 | B1* | 5/2018 | Reading | H04L 63/08 |
| 2009/0228474 | A1* | 9/2009 | Chiu | G06F 17/30516 |
| 2015/0207823 | A1* | 7/2015 | Mahbod | H04L 47/10 |
| | | | | 709/228 |
| 2016/0021396 | A1* | 1/2016 | Metzler | H04N 19/61 |
| | | | | 375/240.2 |

* cited by examiner

*Primary Examiner* — Lut Wong
(74) *Attorney, Agent, or Firm* — Cooper Legal Group, LLC (57) ABSTRACT

A webpage navigation of a user over a timeframe and a second webpage navigation of a second user over a second timeframe may be received. A time-variant variable-order Markov model, comprising a context tree, may be generated utilizing the webpage navigation and the second webpage navigation. A third webpage navigation of a third user may be received. A probability that the third user may interact with content, that the third user is a non-human entity, and/or that the third user will access a website may be determined based upon an evaluation of the third webpage navigation using the time-variant variable-order Markov model. A second client device is instructed to present the content to the third user, to present a human verification mechanism to the third user, and/or to instruct a server, providing the website, to alter a server capacity for the website.

20 Claims, 10 Drawing Sheets

USER ACTION PREDICTION

BACKGROUND

Service providers may desire to determine a likelihood that a user may interact with content, navigate to a website, and/or whether the user is a non-human entity (e.g., a malicious bot). In an example, the likelihood that the user may interact with the content may be based upon a user profile of the user and/or a current webpage that the user may be viewing. However, user behavior of the user may alter over time, while the user profile may not alter to reflect the user's changing behavior. Unfortunately, a service provider may not provide users with content and/or access to websites that reflect the users' current interests. Additionally, the service provider may have difficulty identifying non-human entities.

SUMMARY

In accordance with the present disclosure, one or more client devices, systems, and/or methods for user action prediction are provided. In an example, a webpage navigation of a user over a timeframe may be received (e.g., the user navigating to a sports article webpage and then to a sports blog webpage). A second webpage navigation of a second user over a second timeframe may be received (e.g., the second user navigating to the sports article webpage and then to a cooking article webpage). The second timeframe may overlap the timeframe. The webpage navigation and/or the second webpage navigation may be transformed into a format, and loaded into a time-variant variable-order model.

In an example, the time-variant variable-order model (e.g., a Markov model) may be generated (e.g., trained) utilizing the webpage navigation, the second webpage navigation, and/or webpage navigations of other users. The time-variant variable-order model may be trained to predict a probability that if a user navigates to a webpage followed by a second webpage, then the user will navigate to a target webpage (e.g., a plurality of webpage navigations of users may indicate a relatively high probability that if a user navigates to the sports article webpage, then the user will navigate to the sports blog webpage or similar webpage). The time-variant variable-order model may comprise a context tree (e.g., the context tree may comprise nodes corresponding to a sequence of webpages navigated to by users and branches (e.g., substring operators), between nodes, corresponding to webpage navigation actions of users between webpages). The time-variant variable-order model may be generated utilizing in window aggregation. The in window aggregation may output a webpage location of the user, (e.g., a webpage visited by the user, a second webpage visited by the user, etc.) based upon the webpage navigation, for one or more time points. The in window aggregation may output a second webpage location of the second user, based upon the second webpage navigation, for one or more second time points. In an example, a branch of the context tree may be pruned based upon the branch corresponding to an irrelevant node (e.g., users may not typically navigate from a videogame webpage to a privacy notice webpage, and thus a branch representing user navigation between such webpages may be pruned).

A third webpage navigation of a third user may be received. A probability that the third user may interact with content, that the third user may interact with a website, and/or that the third user is a non-human entity may be determined based upon an evaluation the third webpage navigation using the time-variant variable-order model. In an example, the third user may navigate to a banking account creation webpage, to a social network account creation webpage, and then to an investing account creation webpage, which may be indicative of non-humanistic browsing behavior, and thus a human verification mechanism may be presented to the third user. In another example, responsive to a first probability, that the third user may interact with content, exceeding a threshold (e.g., the third user navigates to the sports article, and thus may be predicted to have a high probability of having an interest in a sports newsletter club), a second client device may be instructed to present the content to the third user. In another example, responsive to a second probability, that the third user may interact with a website, exceeding a second threshold, a server, providing the website, may be instructed to alter a server capacity for the website (e.g., numerous users may be predicted to view a Super Bowl news article, and thus server capacity for providing the Super Bowl news article may be increased).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
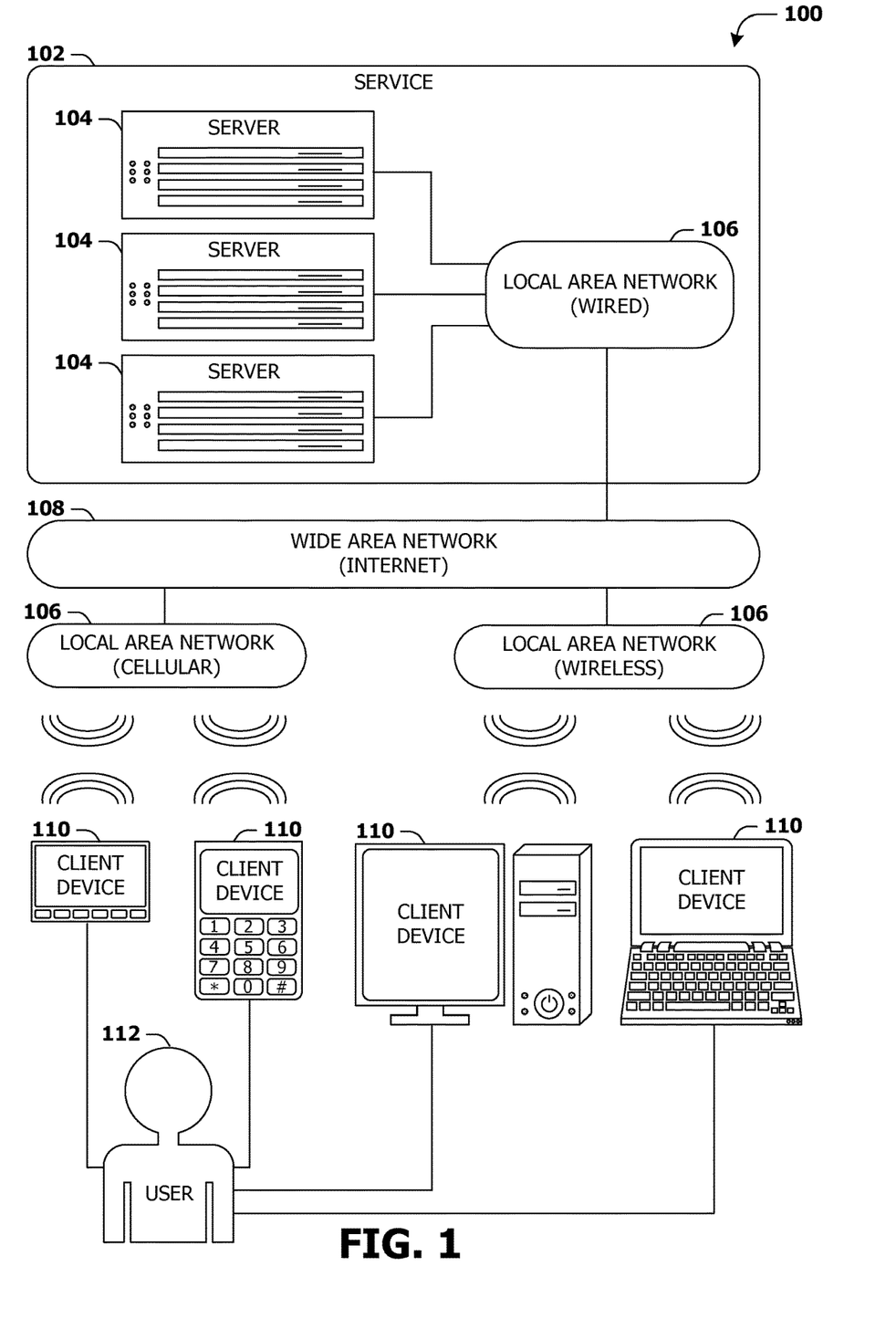
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
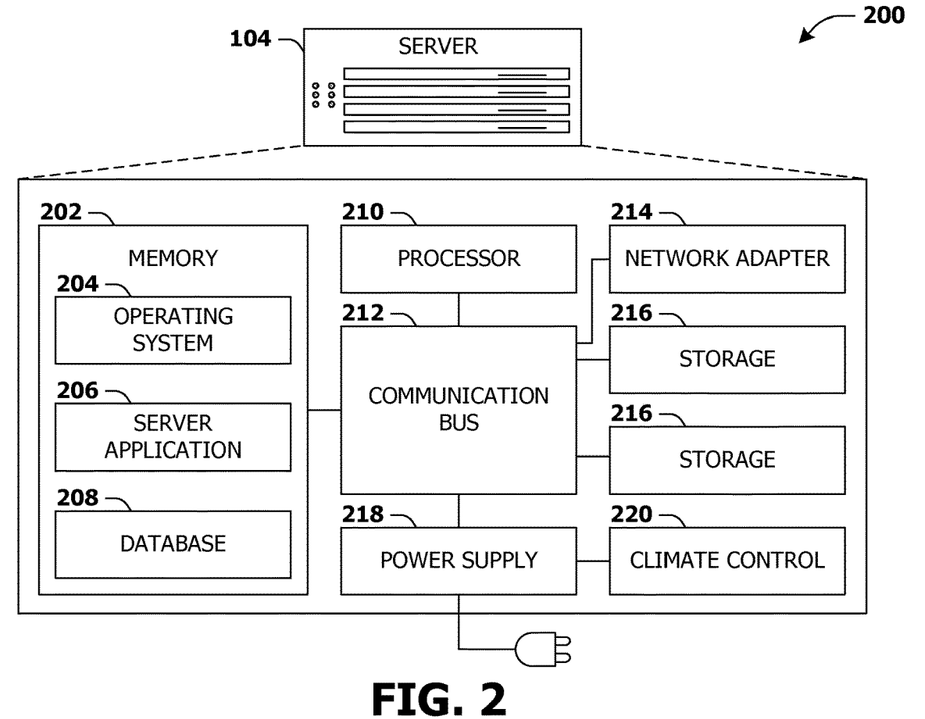
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
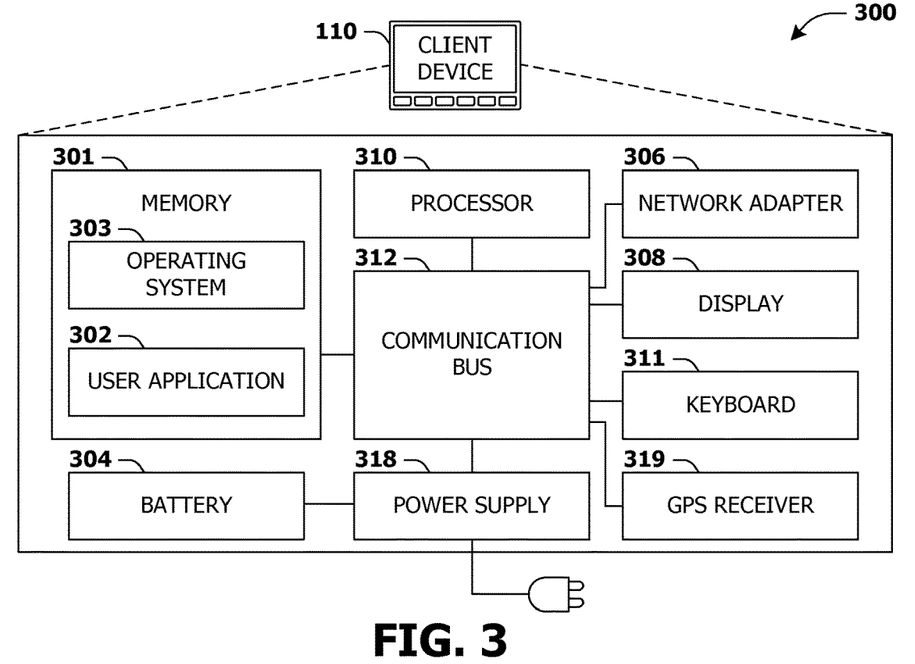
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for user action prediction are provided. A service provider may desire to determine a probability that a user may interact with content, a website, and/or is a non-human entity (e.g., a bot utilized for malicious and/or illegal activity). A webpage navigation of a first user, on a client device, over a timeframe (e.g. the first user navigating to various webpages over 6 hours or some other amount of time) may be identified. A second webpage navigation of a second user, on a second client device, over a second timeframe (e.g., a second user navigating to various webpages) may be identified.

A time-variant variable-order Markov model may be generated utilizing the webpage navigation, the second webpage navigation, and/or other webpage navigations of other users (e.g., a plurality of users navigating between various webpages may be used to train the time-variant variable-order Markov model). The time-variant variable-order Markov model may comprise a context tree (e.g., a distributed evolving context tree) corresponding to a sequence of webpages navigated to by the user (e.g., nodes) and webpage navigation between webpages (e.g., branches between nodes). The time-variant variable-order Markov model may comprise a time series for each webpage navigation (e.g., comprising a location of the user for a given time point). The time-variant variable-order model may utilize parallel modeling. For example, the parallel modeling may comprise parallel pruning of one or more branches of the context tree corresponding to one or more irrelevant nodes. The time-variant variable-order Markov model may identify the webpage navigation as anomalous (e.g., the user may comprise the non-human entity based upon the user navigating between unrelated webpages, such as between a privacy notice webpage, a cooking webpage, an account creation webpage, etc.).

The context tree may provide a probability of a future user webpage navigation action of the user based upon a past user webpage navigation of the user. For example, based upon the user having navigated from a cooking webpage to a health webpage and then to a grocery store webpage, the context tree may indicate that there is a relatively high probability the user may navigate to a recipe webpage and a probability that the user may interact with content on the recipe webpage (e.g., a subscription interface to subscribe to a recipe club). Responsive to the probability that the user may interact with the content exceeding a threshold, the service provider may place the content on the recipe webpage.

Thus, the service providers may provide relevant content (e.g., content that the user is likely to interact with) to the user. The ability to identify websites and/or content that the user has a high probability of interacting with may increase user satisfaction with the service provider and decrease computing resources otherwise wasted by provided the user with irrelevant content. Additionally, providing the user with relevant content may reduce a time the user may use manually searching for the content.

FIGS. 4A-4D illustrate an example system 400 for predicting user action utilizing a prediction component 420. The prediction component 420 may receive a webpage navigation 411 of a user, of a client device 402, over a timeframe 405 (e.g., from 6 pm to 10 pm). The webpage navigation 411 may comprise the user navigating from a webpage 404 at a first time point, to a second webpage 406 at a second time point, and ending a browsing session on a third webpage 408 at a third time point. The prediction component 420 may receive a second webpage navigation 413 of a second user, of a second client device 410, over a second timeframe 407 (e.g., from 8 pm to 12 pm). The second webpage navigation 413 may comprise the second user navigating from the webpage 412 at a fourth time point, to the third webpage 414 at a fifth time point, and ending a second browsing session on a fourth webpage 416 at a sixth time point. In an example, a plurality of webpage navigations may be collected for various users. Such users may take affirmative action, such as providing opt-in consent, to allow access to and/or use of the webpage navigation 411, the second webpage navigation 413, and/or other webpage navigations associated with accessing content.

Figure 4A:
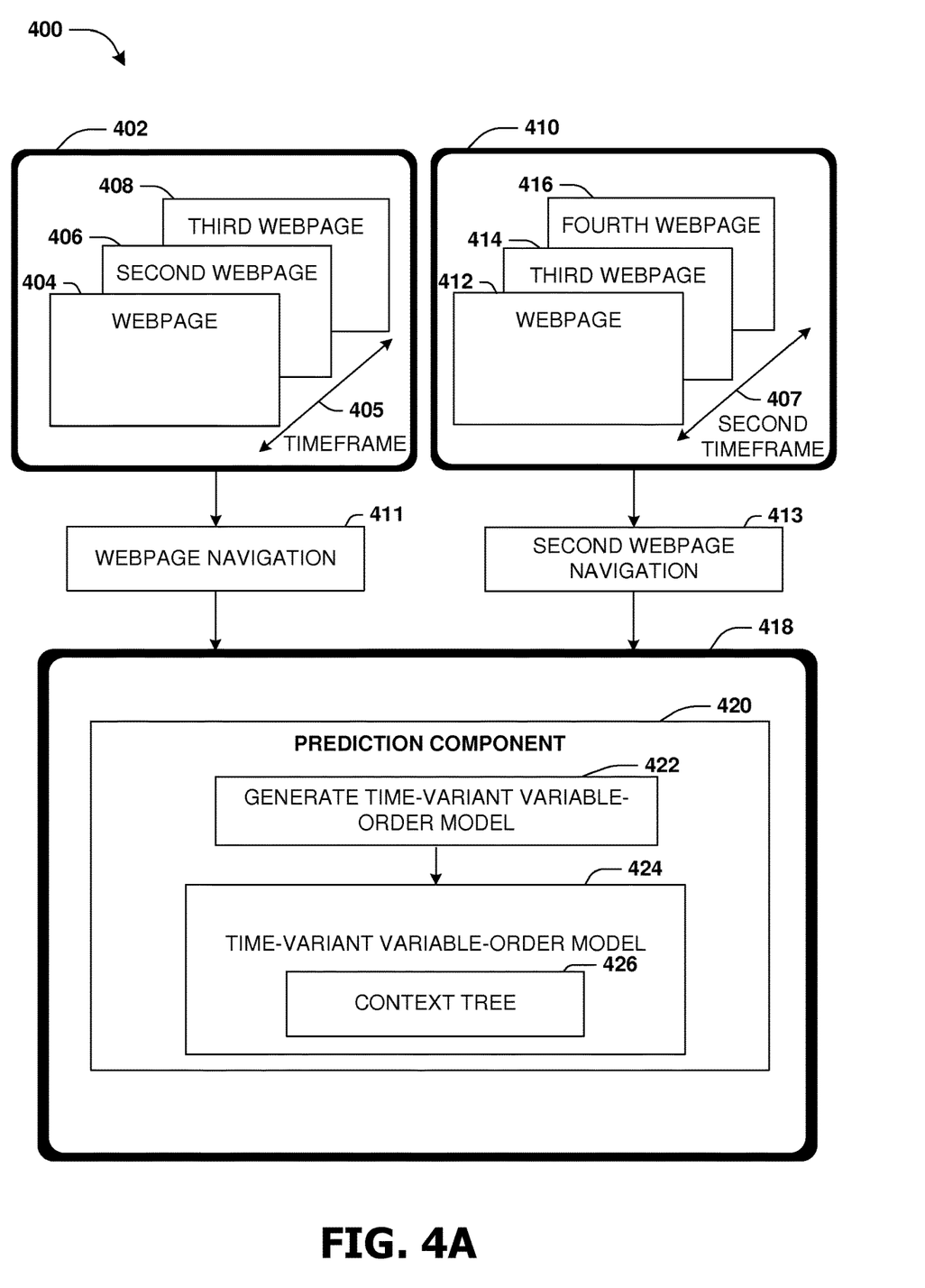
FIG. 4A is a component block diagram illustrating an example system for user action prediction, where a time-variant variable-order model, comprising a context tree, is generated.

The prediction component 420 may generate 422 a time-variant variable-order model 424 (e.g., a Markov model) based upon the webpage navigation 411, the second webpage navigation 413, and/or other webpage navigations of users (e.g., such as one hundred thousand webpage navigations or some other number of webpage navigations by various users). In an example, the time-variant variable-order model 424 may be trained to identify user browsing patterns that may be used to predict how likely a user may be interested in content given the user visiting a particular webpage. In another example, the time variable model 424 may be trained to identify human user browsing patterns, such as a user browsing between webpages of related content, compared to non-humanistic user browsing patterns (e.g., browsing behavior of a malicious bot, such as repeated visits to account creation webpages). The time-variant variable-order model 424 may comprise a variable-order Markov chain (e.g., between $3^{rd}$ order to $10^{th}$ order or some other order). The time-variant variable-order model 424 may comprise a context tree 426 (e.g., a distributed evolving context tree). The context tree 426 may model an evolution of one or more variable-order Markov chains over time in parallel. The context tree 426 may utilize parallel modeling. The parallel modeling may be utilized to model one or more webpage navigations to a target webpage (e.g., webpages that users may navigate between until reaching the target webpage). The context tree 426 may comprise one or more nodes connected via branches. In an example, nodes may comprise a sequence of previously visited webpages, where a parent node (e.g., a node representing a first webpage visited at an earlier time) comprises a suffix node to a child node (e.g., a second node representing a second webpage visit following the first webpage visit). In an example, a link between the node and the second node may comprise a branch (e.g., a substring operator). The parallel modeling may be utilized to prune one or more branches, of the context tree 426, corresponding to one or more irrelevant nodes. A number of branches that are pruned may be dependent upon a number of webpages comprised in the webpage navigation 411 (e.g., an order of the time-variant variable-order model 424). For example, based upon the user visiting 7 webpages, to generate the webpage navigation 411, the time-variant variable-order model 424 may comprise a $7^{th}$ order time-variant model (e.g., to represent the webpage navigation 411). In an example, the time-variant variable-order model 424 may utilize merely 5 of the 7 webpages visited to generate a $5^{th}$ order time variant model. In an example, users may not generally navigate between a videogame webpage and a terms of use webpage, and thus a branch, between the node, representing a visit to the videogame webpage, and the second node, representing a visit to the terms of use webpage, may be removed from the context tree 426. The context tree 426 may determine probabilities, in a time series, for each webpage navigation. The context tree 426 may be utilized to analyze trends in users' webpage navigations and/or anomalous trends in the users' webpage navigation.

Figure 4B:
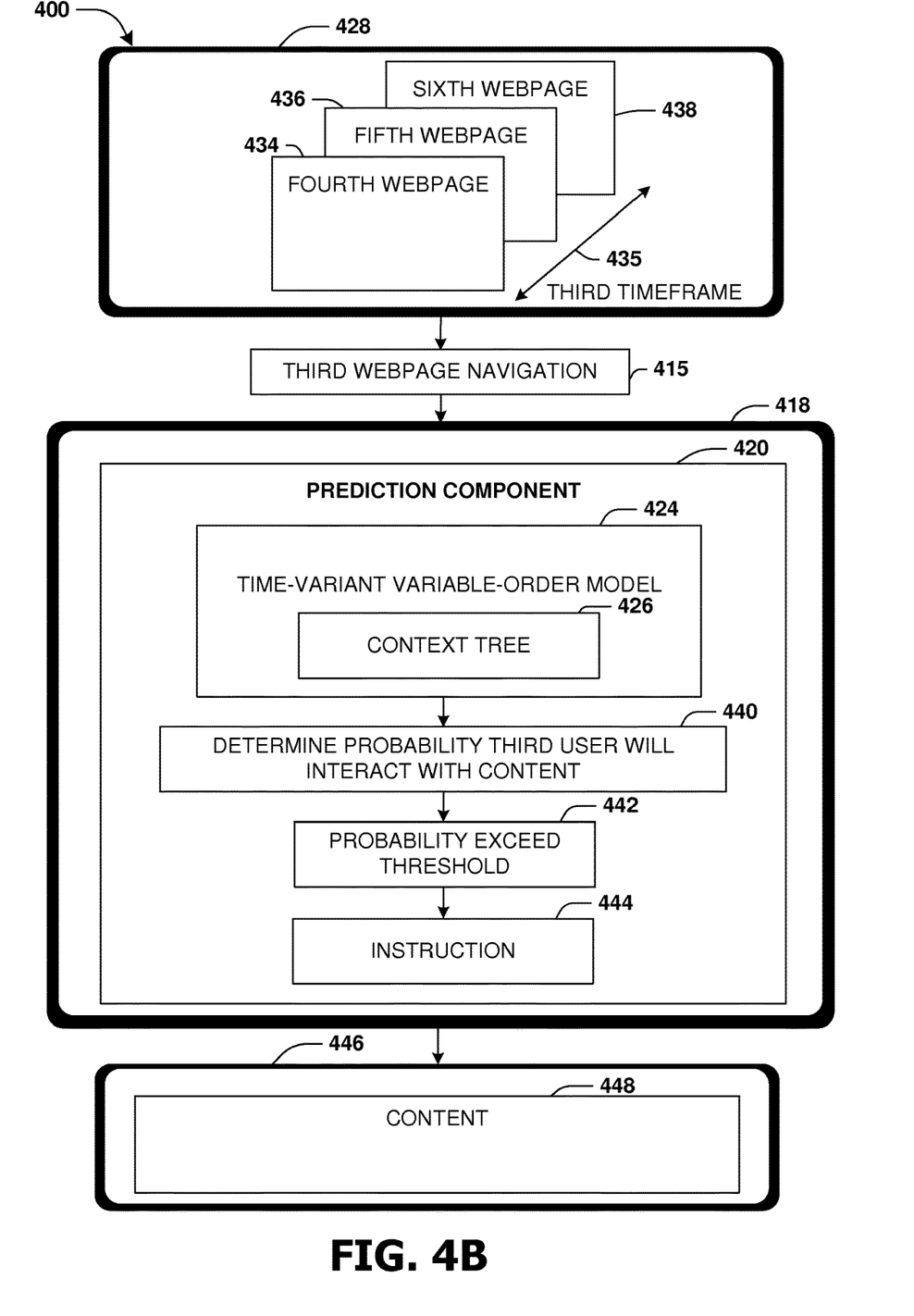
FIG. 4B is a component block diagram illustrating an example system for user action prediction, where a second client device is instructed to present content to a third user.

FIG. 4B illustrates the example system 400 determining a probability 440 that a third user will interact with the content 448. The prediction component 420 may receive a third webpage navigation 415 of the third user, of a third client device 428, over a third timeframe 435. The third webpage navigation 415 may comprise the third user navigating from a fourth webpage 434 at a seventh time point, to a fifth webpage 436 at a eighth time point, and ending a session on a sixth webpage 438 at a ninth time point.

The probability 440 that the third user may interact with the content 448 (e.g., an offer to sell a product, an offer to sell a service, a digital video, etc.) may be determined based upon an evaluation the third webpage navigation 415 using the time-variant variable-order model 424 (e.g., how likely is a user to engage with the content 448 based upon navigating between the fourth webpage 434, the fifth webpage 436, and the sixth webpage 438 may be determined based upon the time variable model 424 indicating likelihoods that other users view similar content after navigating to such webpages). Responsive to the probability 440 exceeding a threshold 442 (e.g., over 5% probability or some other probability), the prediction component 420 may generate an instruction 444 to provide the content 448 to the third user on a client device 446 (e.g., the third client device 428 or any other client device). In an example, the time-variant variable-order model 420 may be utilized to identify a first trend indicating that the third user has a decreased probability of interacting with the content 448. Thus, the prediction component 420 may utilize the first trend to determine that the content 448 may not be relevant to the third user. In another example, the time-variant variable-order model 420 may be utilized to identify a second trend indicating the third user has an increased probability of interacting with the content 448. Thus, the prediction component 420 may utilize the second trend to determine that the content 448 may have relevance to the third user.

Figure 4C:
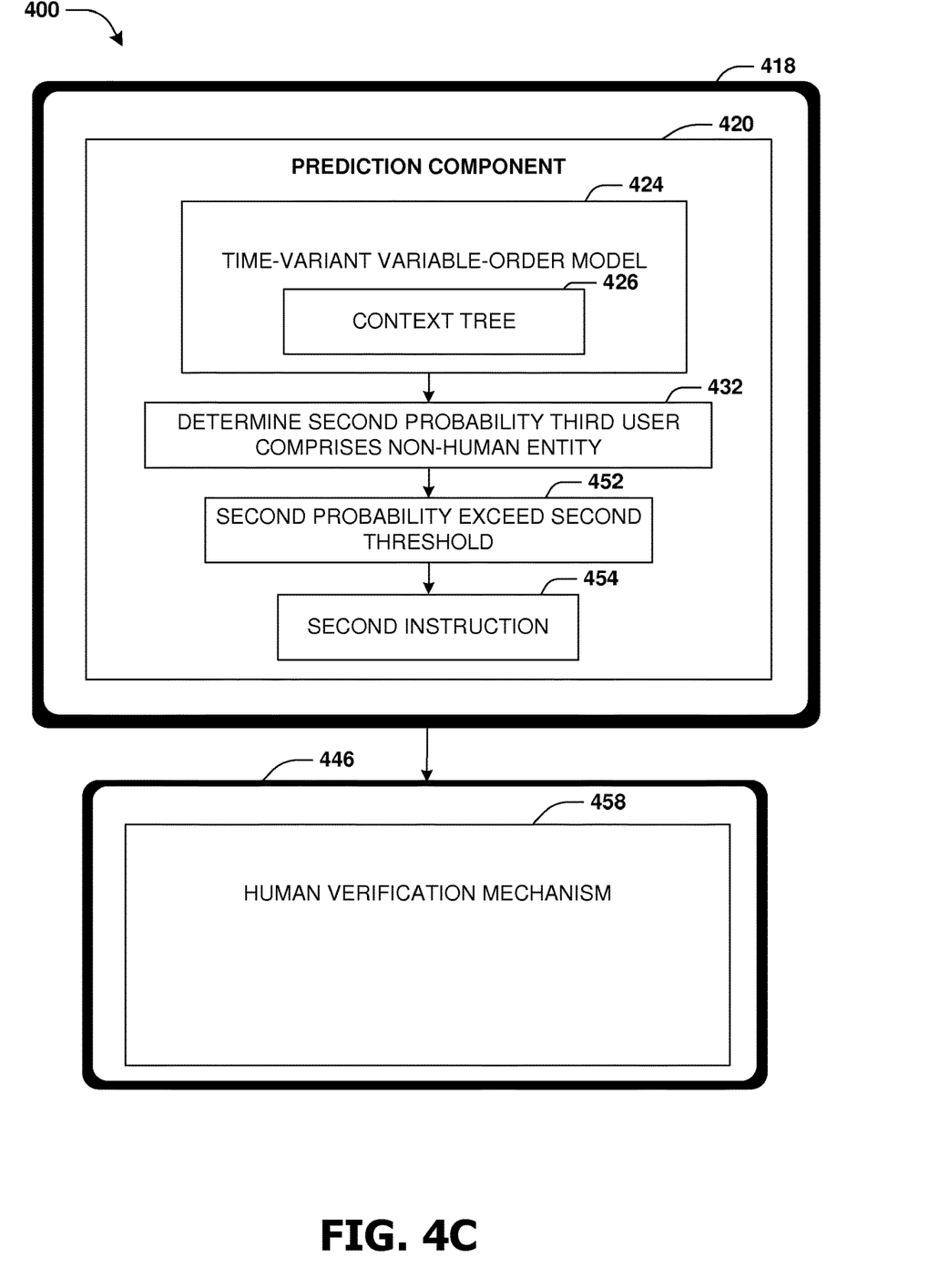
FIG. 4C is a component block diagram illustrating an example system for user action prediction, where a second client device is instructed to present a human verification mechanism to a third user.

FIG. 4C illustrates the example system 400 determining a second probability 432 of the third user being a non-human entity. Based upon the prediction component 420 receiving the third webpage navigation 415, the second probability 432 that the third user may comprise the non-human entity (e.g., a bot utilized for malicious and/or illegal activity) may be determined based upon the evaluation the third webpage navigation 415 using the time-variant variable-order model 424 (e.g., the time-variant variable-order model 424 may indicate that human users did not navigate between such webpages, such as between three different account creation webpages for various unrelated services). Responsive to the second probability 432 exceeding a second threshold 452 (e.g., over 10% probability or some other probability), the prediction component 420 may generate a second instruction 454 to provide a human verification mechanism 458 (e.g., a text captcha, an audio captcha, etc.) to the third user on the client device 446.

Figure 4D:
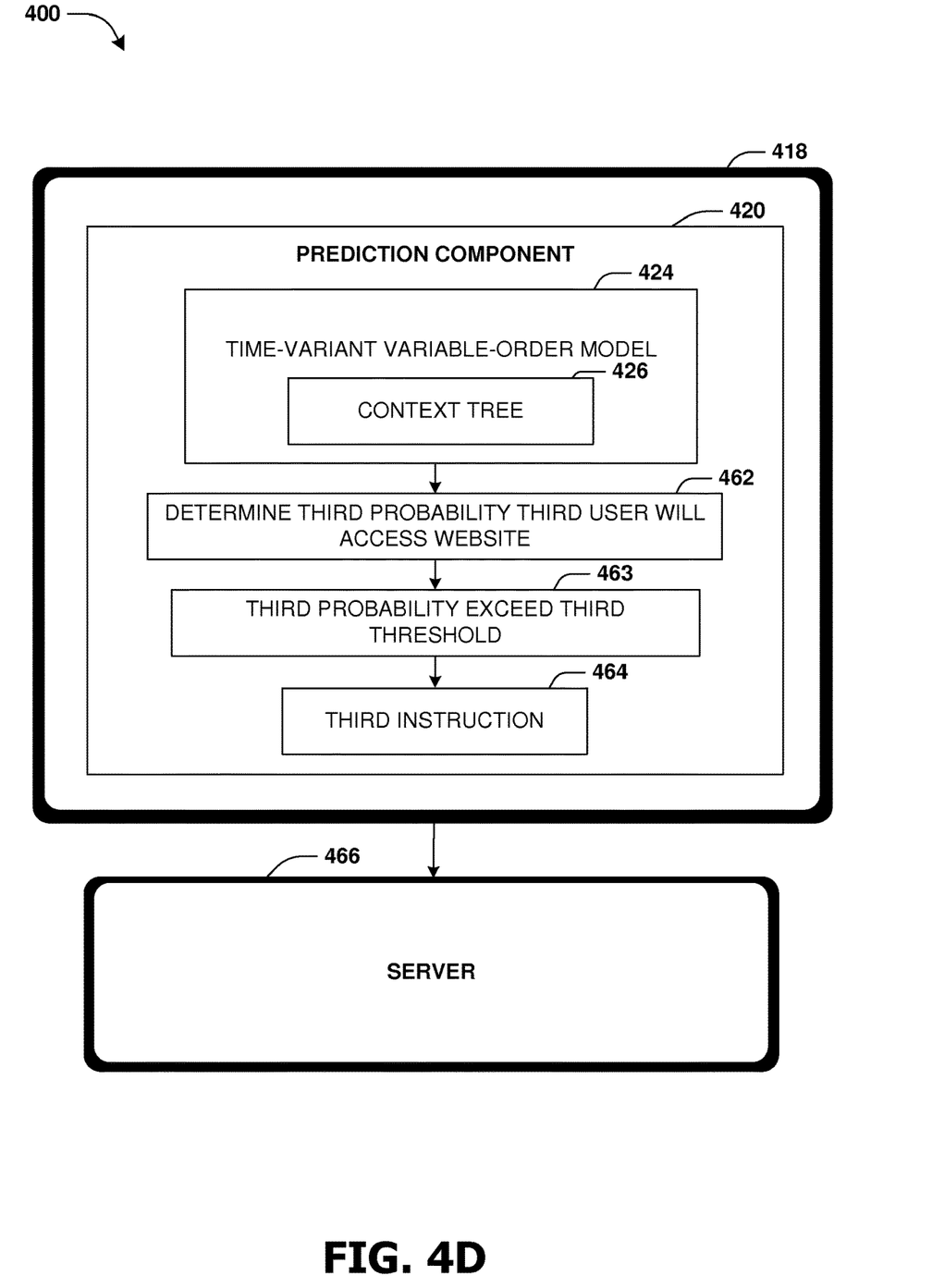
FIG. 4D is a component block diagram illustrating an example system for user action prediction, where a server is instructed to alter a server capacity for a website.

FIG. 4D illustrates the example system 400 determining a third probability 462 of the third user accessing a target website. Based upon the prediction component 420 receiving the third webpage navigation 415, the third probability 462 that the third user may access the target website may be determined based upon the evaluation the third webpage navigation 415 using the time-variant variable-order model 424 (e.g., the time-variant variable-order model 424 may indicate that users that visited the fourth webpage 434, the fifth webpage 436, and/or the sixth webpage 438 had a high likelihood of visiting the target webpage).

In an example, responsive to the third probability 462 exceeding a third threshold 463 (e.g., over 3% probability or some other probability), the prediction component 420 may generate a third instruction 464 to alter a server capacity of a server 466 providing the target website (e.g., predicted increased traffic based upon a threshold number of users visiting the fourth webpage 434, the fifth webpage 436, and/or the sixth webpage 438, and thus potentially visiting the target webpage). For example, responsive to a threshold number of users having the third probability 462 exceeding the third threshold 463, the third instruction 464 may comprise the instruction to increase the server capacity of the server 466. The server capacity of the server 466 may be decreased if less than a second threshold number of users have a probability exceeding a threshold.

In an example, the time-variant variable-order model 420 may be utilized to identify a third trend indicating that the third user has a decreased probability of interacting with the website. The prediction component 420 may utilize the third trend to determine that the website may not be relevant to the third user. In another example, the time-variant variable-order model 420 may be utilized to identify a fourth trend indicating that the third user has an increased probability of interacting with the website. The prediction component 420 may utilize the fourth trend to determine that the website may have relevance to the third user.

Figure 5A:
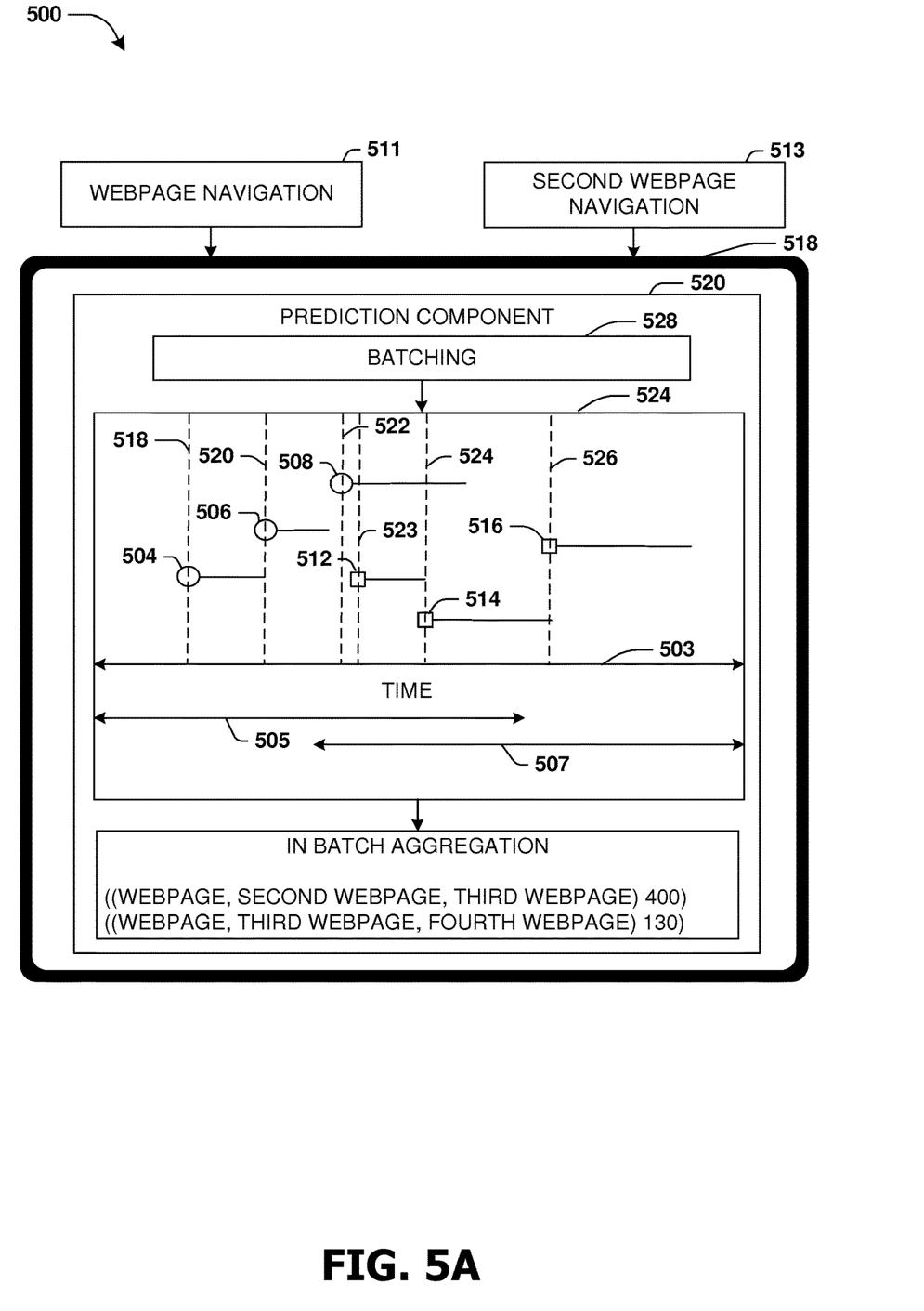
FIG. 5A is a component block diagram illustrating an example system for user action prediction, where a prediction component receives a webpage navigation of a user and a second webpage navigation of a second user.
Figure 5B:
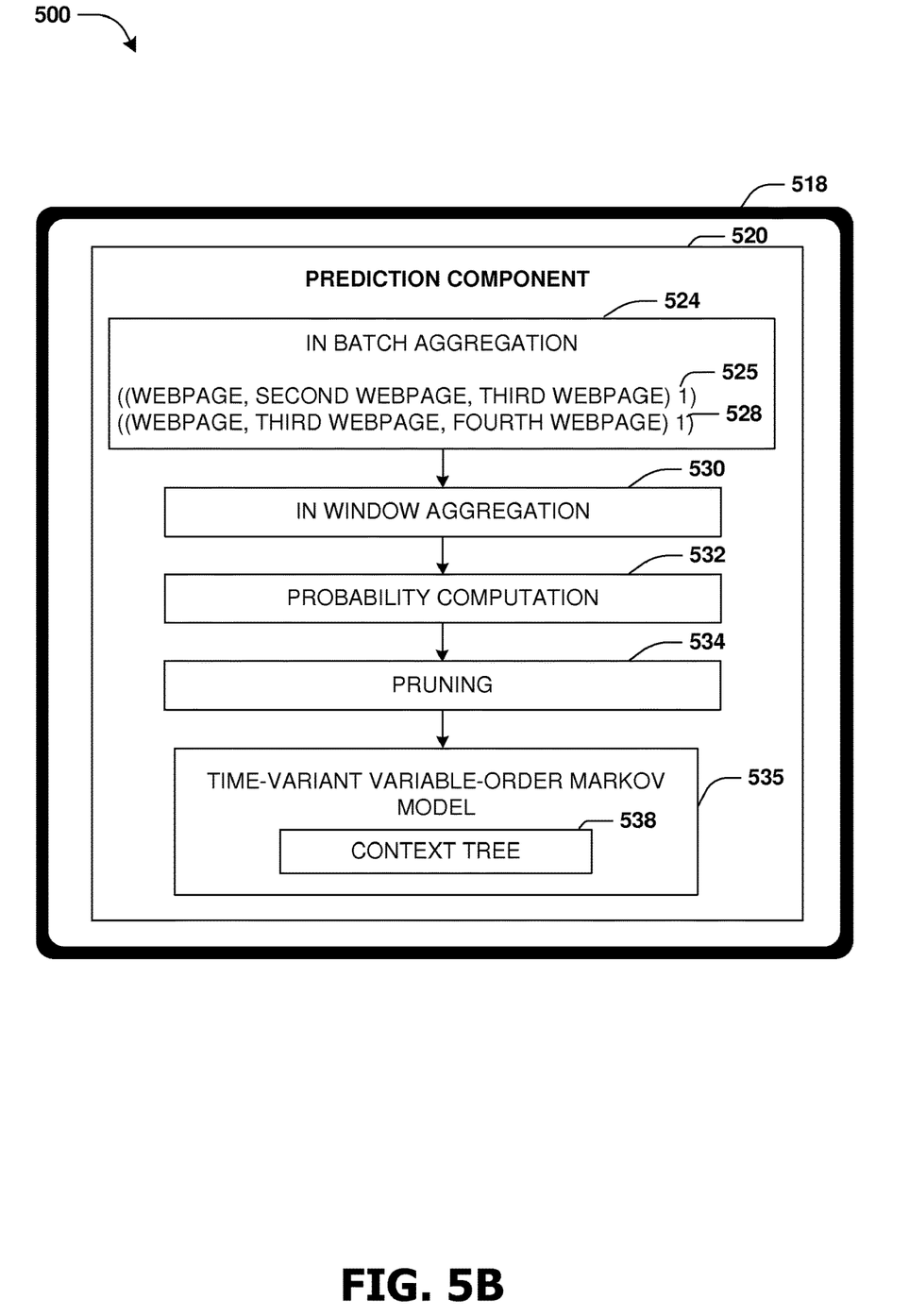
FIG. 5B is a component block diagram illustrating an example system for user action prediction, where a prediction component generates a time-variant variable-order Markov model based upon a webpage navigation of a user and a second webpage navigation of a second user.

FIGS. 5A-5B illustrate an example system 500 for generating a time-variant variable-order Markov model 535 utilizing a prediction component 520. The prediction component 520 may receive a webpage navigation 511 of a user, of a client device, over a timeframe 505 (e.g., from 4 am to 12 pm). The prediction component 520 may receive a second webpage navigation 513 of a second user, of a second client device, over a second timeframe 507 (e.g., from 8 am to 2 pm). The prediction component 520 may utilize batching 528. The batching may comprise extracting the webpage navigation 511 and/or the second webpage navigation 513, transforming the webpage navigation 511 and/or the second webpage navigation 513 into a format, and loading the webpage navigation 511 and/or the second webpage navigation 513, according to the format, into the time-variant variable-order model 535.

The webpage navigation 511 is illustrated by circles, where each circle represents a webpage with which the user has navigated, relative to time 503. The second webpage navigation 513 is illustrated by squares, where each square represents a webpage with which the second user has navigated, relative to the time 503. Time points may be illustrated by vertical dashed lines intersecting the circles and/or squares. The user may navigate from a webpage 504 at a first time point 518, to a second webpage 506 at a second time point 520, and ending a session on a third webpage 508 at a third time point 522. The second webpage navigation 513 may comprise the second user navigating from the webpage 512 at a fourth time point 523, to the third webpage 514 at a fifth time point 524, and ending a second session on a fourth webpage 516 at a sixth time point 526. The user navigation 511 and the second user navigation 513 may be combined in a batch. The batch may comprise a combined timeframe of the timeframe 505 and the second timeframe 507 (e.g., from 8 am to 2 pm).

The prediction component 520 may utilize in batch aggregation to identify a number of users' navigating to webpages in a same or similar order or pattern as the user and/or the second user. For example, the in batch aggregation may output an order of webpages navigated (e.g., the webpage, the second webpage, and the third webpage) to by the user, and the number of users that navigated to webpages in that order or pattern (e.g., 400). For example, the in batch aggregation may output a second order of webpages navigated (e.g., the webpage, the third second webpage, and the fourth webpage) to by the second user, and the number of users that navigated to webpages in that order (e.g., 130).

FIG. 5B illustrates the example system 500 generating the time-variant variable-order Markov model 535. The prediction component 520 may utilize in window aggregation 530 to output a webpage location of the user, based upon the webpage navigation 511, for one or more time points (e.g., the first time point 518, the second time point 520, the third time point 522, etc., as illustrated in FIG. 5A) and a second webpage location of the second user, based upon the second webpage navigation 513, for one or more second time points (e.g., the fourth time point 523, the fifth time point 524, the sixth time point 526, etc., as illustrated in FIG. 5A). The prediction component 520 may perform one or more probability computations 532 to determine probabilities for a context tree 538 (e.g., a probably that a user visiting a first webpage, represented by a first node, may navigate to a second webpage represented by a second node, where the navigation is represented by a branch, comprising a substring operator, between the first node and the second node). The prediction component 520 may prune 534 (e.g., a parallel prune) one or more branches of the context tree 538 corresponding to one or more irrelevant nodes. The prediction component 520 may generate the time-variant variable-order Markov model 535 to comprise the context tree 538 (e.g., such as the context tree 538 having been pruned 534).

Figure 6:
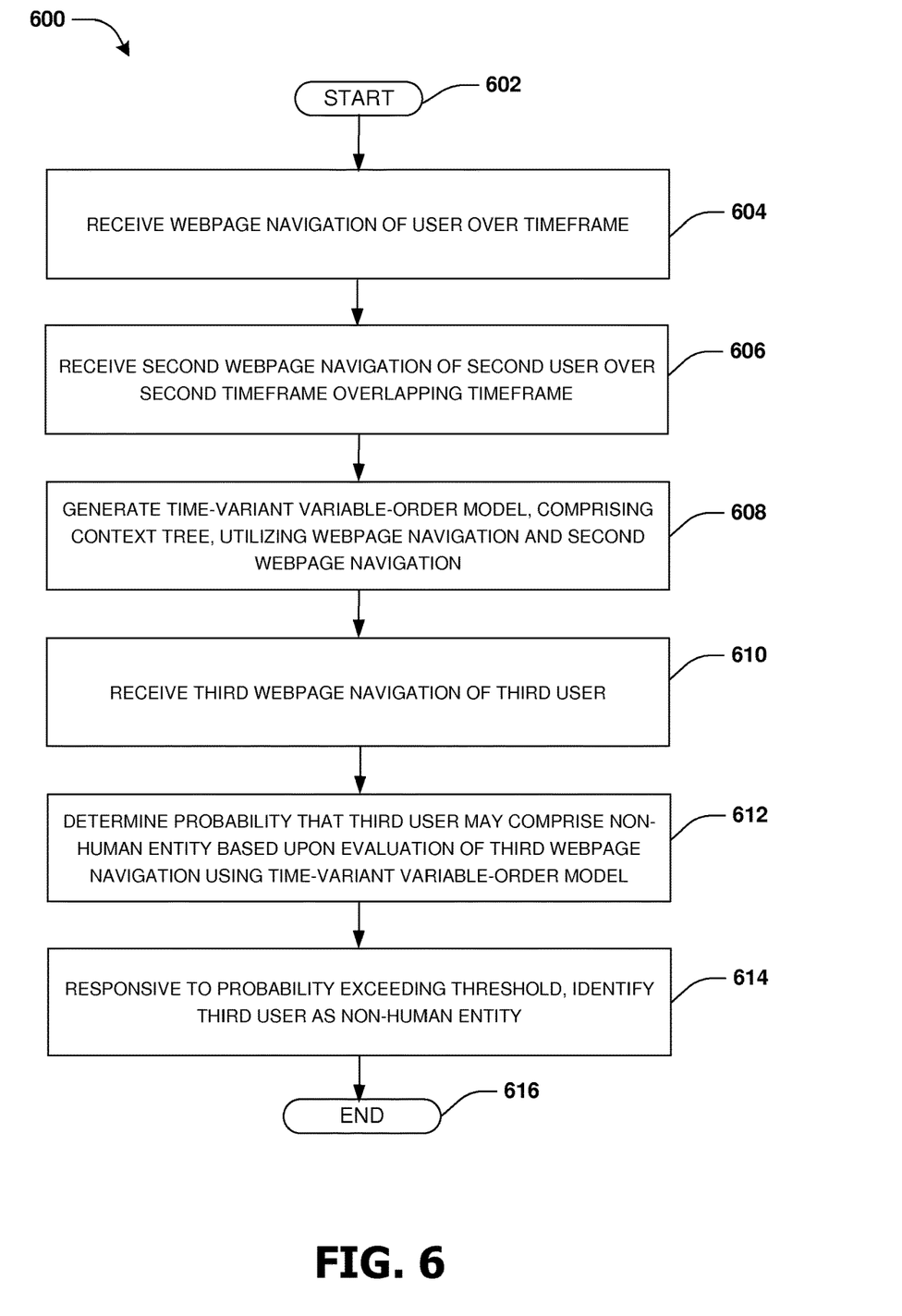
FIG. 6 is a flow chart illustrating an example method of user action prediction.

An embodiment of user action prediction is illustrated by an example method 600 of FIG. 6. At 602, the method 600 starts. At 604, a webpage navigation of a user over a timeframe may be received. At 606, a second webpage navigation of a second user over a second timeframe may be received. At 608, a time-variant variable-order model (e.g., a Markov model), comprising a context tree (e.g., a distributed evolving context tree), may be generated utilizing the webpage navigation and the second webpage navigation. At 610, a third webpage navigation, of a third user, may be received. At 612, a probability that the third user may comprise a non-human entity may be determined based upon an evaluation of the third webpage navigation using the time variable variant model. At 614, responsive to the probability exceeding a threshold, the third user may be identified as the non-human entity. At 616, the method 600 ends.

Figure 7:
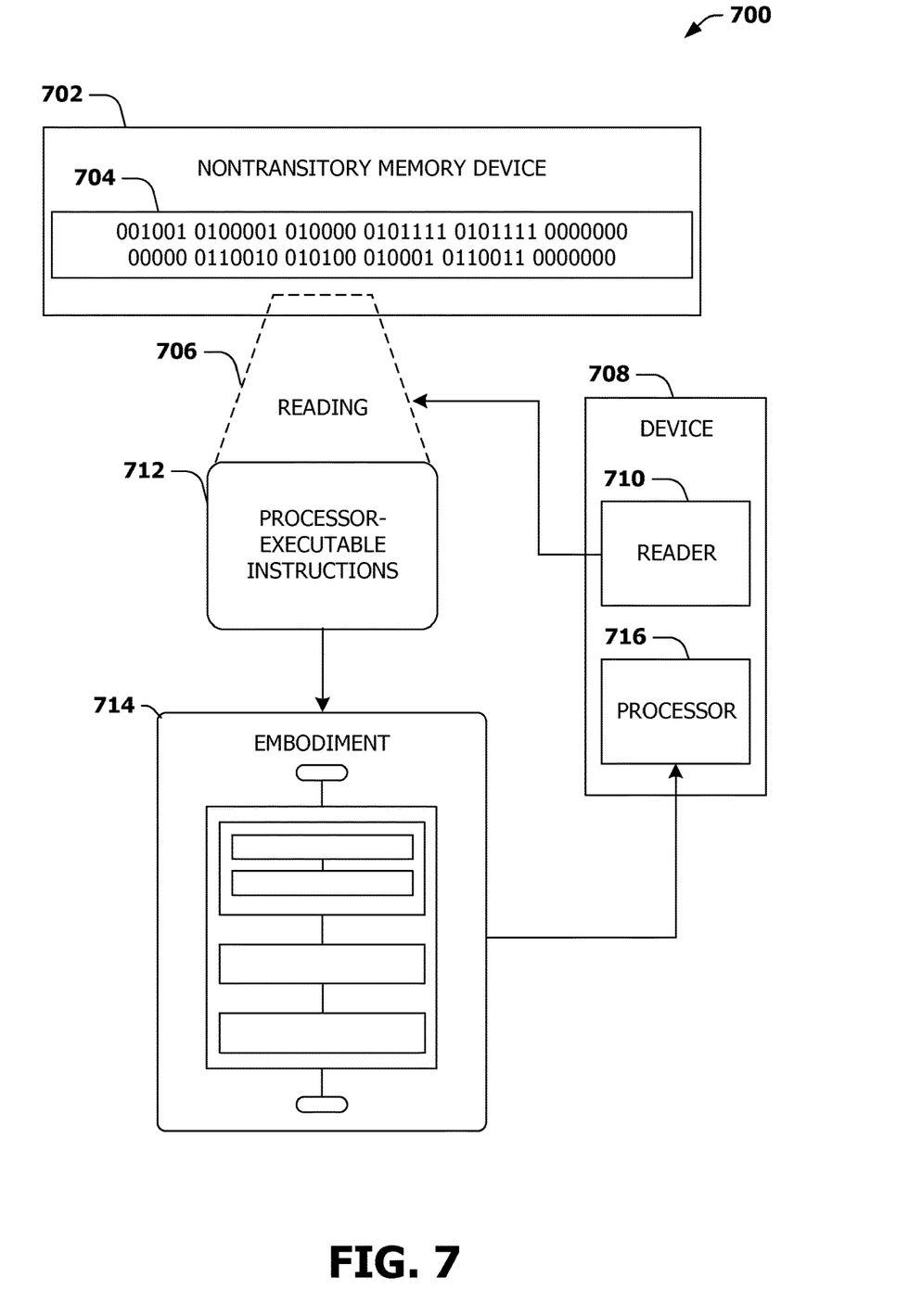
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example method 600 of FIG. 6, for example. In some embodiments, the processor-executable instructions, when executed on the processor 716 of the device 708, are configured to implement a system, such as at least some of the example system 400 of FIGS. 4A-4D, and/or at least some of the example system 500 of FIGS. 5A-5B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A client device for user action prediction, the client device comprising:
   a processor;
   a display; and
   a memory storing instructions that, when executed on the processor, provide a prediction component configured to:
   receive a webpage navigation of a user over a timeframe;
   receive a second webpage navigation of a second user over a second timeframe, the second timeframe overlapping the timeframe;
   generate a time-variant variable-order model, comprising a context tree, utilizing the webpage navigation and the second webpage navigation;
   receive a third webpage navigation of a third user;
   determine a probability that the third user will interact with content based upon an evaluation of the third webpage navigation using the time-variant variable-order model;
   responsive to the probability exceeding a threshold, instruct a second client device to present the content to the third user; and
   responsive to predicting that more than a threshold number of a plurality of users are associated with a probability of interacting with the content that exceeds a threshold probability based upon a determination that a second threshold number of users visited one or more webpages associated with a likelihood of visiting the content, predict increased traffic for a server providing the content and instruct the server to increase a server capacity for the content, wherein the one or more webpages associated with the likelihood of visiting the content are different than the content.

2. The client device of claim 1, the time-variant variable-order model comprising a Markov model.

3. The client device of claim 1, the prediction component configured to:
   receive an extraction of the webpage navigation of the user;
   transform the webpage navigation into a format; and
   load the webpage navigation, according to the format, into the time-variant variable-order model.

4. The client device of claim 1, the prediction component configured to:
   receive an extraction of the second webpage navigation of the second user;
   transform the second webpage navigation into a format; and
   load the second webpage navigation into the time-variant variable-order model.

5. The client device of claim 1, the prediction component configured to generate the time-variant variable-order model utilizing:
   in window aggregation, the in window aggregation outputting:
      a webpage location of the user, based upon the webpage navigation, for one or more time points; and
      a second webpage location of the second user, based upon the second webpage navigation, for one or more second time points.

6. The client device of claim 1, the time-variant variable-order model configured to at least one of:
   identify a first trend indicating the third user has a decreased probability of interacting with the content; or
   identify a second trend indicating the third user has an increased probability of interacting with the content.

7. The client device of claim 1, the prediction component configured to:
   prune a branch of the context tree based upon the branch corresponding to a first type of node.

8. A method for user action prediction, comprising:
   receiving a webpage navigation of a user over a timeframe;
   receiving a second webpage navigation of a second user over a second timeframe, the second timeframe overlapping the timeframe;
   generating a time-variant variable-order model, comprising a context tree, utilizing the webpage navigation and the second webpage navigation;
   receiving a third webpage navigation of a third user;
   determining a probability that the third user is a non-human entity based upon an evaluation of the third webpage navigation using the time-variant variable-order model;
   responsive to the probability exceeding a threshold, identifying the third user as the non-human entity; and
   responsive to predicting that more than a threshold number of a plurality of users are associated with a probability of interacting with content that exceeds a threshold probability, predicting increased traffic for a server providing the content and instructing the server to increase a server capacity for the content.

9. The method of claim 8, the time-variant variable-order model comprising a Markov model.

10. The method of claim 8, comprising:
    receiving an extraction of the webpage navigation of the user;
    transforming the webpage navigation into a format; and
    loading the webpage navigation, according to the format, into the time-variant variable-order model.

11. The method of claim 8, comprising:
    receiving an extraction of the second webpage navigation of the second user;
    transforming the second webpage navigation into a format; and
    loading the second webpage navigation, according to the format, into the time-variant variable-order model.

12. The method of claim 8, comprising:
    utilizing in window aggregation to output:
       a webpage location of the user, based upon the webpage navigation, for one or more time points; and
       a second webpage location of the user, based upon the second webpage navigation, for one or more second time points.

13. The method of claim 8, comprising:
    pruning a branch of the context tree based upon the branch corresponding to a first type of node.

14. The method of claim 8, comprising:
    responsive to identifying the third user as the non-human entity, presenting the third user with a human verification mechanism.

15. A client device for user action prediction, the client device comprising:
- a processor;
- a display; and
- a memory storing instructions that, when executed on the processor, provide a prediction component configured to:
  - receive a webpage navigation of a user over a timeframe;
  - receive a second webpage navigation of a second user over a second timeframe, the second timeframe overlapping the timeframe;
  - generate a time-variant variable-order model, comprising a context tree, utilizing the webpage navigation and the second webpage navigation;
  - receive webpage navigations of a plurality of users;
  - determine a probability that each user of the plurality of users will interact with a website based upon an evaluation of at least one webpage navigation, of the webpage navigations, associated with the user using the time-variant variable-order model; and
  - responsive to predicting that more than a threshold number of the plurality of users are associated with a probability of interacting with the website that exceeds a threshold probability based upon a determination that a second threshold number of users visited one or more webpages associated with a likelihood of visiting the website, predict increased traffic for a server providing the website and instruct the server to alter a server capacity for the website, wherein the one or more webpages associated with the likelihood of visiting the website are different than the website.

16. The client device of claim 15, the time-variant variable-order model comprising a Markov model.

17. The client device of claim 15, the prediction component configured to:
- prune a branch of the context tree based upon the branch corresponding to a first type of node.

18. The client device of claim 15, the prediction component configured to:
- receive an extraction of the webpage navigation of the user;
- transform the webpage navigation into a format;
- load the webpage navigation, according to the format, into the time-variant variable-order model;
- receive an extraction of the second webpage navigation of the second user;
- transform the second webpage navigation into the format; and
- load the second webpage navigation, according to the format, into the time-variant variable-order model.

19. The client device of claim 15, the prediction component configured to generate the time-variant variable-order model utilizing:
- in window aggregation, the in window aggregation outputting:
  - a webpage location of the user, based upon the webpage navigation, for one or more time points; and
  - a second webpage location of the user, based upon the second webpage navigation, for one or more second time points.

20. The client device of claim 15, the time-variant variable-order model configured to at least one of:
- identify a first trend indicating a third user has a decreased probability of interacting with the website; or
- identify a second trend indicating the third user has an increased probability of interacting with the website.

* * * * *